(12) United States Patent
Malhotra (10) Patent No.: US 9,858,381 B2
(45) Date of Patent: Jan. 2, 2018

(54) METHOD OF ANALOG FRONT END OPTIMIZATION IN PRESENCE OF CIRCUIT NONLINEARITY

(71) Applicant: SAMSUNG DISPLAY CO., LTD., Yongin, Gyeonggi-Do (KR)

(72) Inventor: Gaurav Malhotra, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 129 days.

(21) Appl. No.: 14/928,952

(22) Filed: Oct. 30, 2015

(65) Prior Publication Data

US 2016/0154923 A1   Jun. 2, 2016

Related U.S. Application Data

(60) Provisional application No. 62/086,604, filed on Dec. 2, 2014.

(51) Int. Cl.
*G06F 17/50* (2006.01)

(52) U.S. Cl.
CPC ...... *G06F 17/5081* (2013.01); *G06F 2217/10* (2013.01); *G06F 2217/82* (2013.01)

(58) Field of Classification Search
CPC ..... H04L 27/04; H04L 27/2278; H04L 27/36; H04L 7/0058; H04L 2025/03426; H04L 2025/03433; H04L 7/0062; H03F 1/3247; H03F 1/3294; H03F 3/24; H03F 1/3252; G06F 17/5036; G06F 2217/10; G06F 2217/82

See application file for complete search history.

(56) References Cited

U.S. PATENT DOCUMENTS

| | | |
|---|---|---|
| 6,516,290 B1 | 2/2003 | Peng |
| 7,173,555 B2 | 2/2007 | Raz |
| 7,263,144 B2 | 8/2007 | Sasson et al. |
| 7,778,320 B2 | 8/2010 | Agazzi et al. |
| 8,233,069 B2 | 7/2012 | Kapusta |
| 8,615,062 B2 | 12/2013 | Chmelar |
| 8,744,377 B2 | 6/2014 | Rimini et al. |

(Continued)

OTHER PUBLICATIONS

Beyene et al., Statistical Simulation of High-Speed links with Transmitter and Receiver Nonlinearities, IEEE, 2014.*

(Continued)

*Primary Examiner* — Nghia Doan (74) *Attorney, Agent, or Firm* — Lewis Roca Rothgerber Christie LLP (57) ABSTRACT

A method for manufacturing a serial link including a channel and a receiver, the link including linear time-invariant elements, the receiver including a continuous-time linear equalizer (CTLE) including a nonlinear block, and a slicer having an input. The method includes: for each of a plurality of candidate CTLE configurations: calculating a first probability density function (PDF), corresponding to a first signal value, at the input of the nonlinear block, calculating a first PDF, corresponding to the first signal value, at the output of the nonlinear block; calculating a second PDF, corresponding to a second signal value, at the input of the nonlinear block, calculating a second PDF, corresponding to the second signal value, at the output of the nonlinear block; and calculating a bit error rate.

20 Claims, 7 Drawing Sheets

(56) References Cited

U.S. PATENT DOCUMENTS

| | | | |
|---|---|---|---|
| 8,831,142 | B2 | 9/2014 | Kotagiri et al. |
| 8,837,626 | B2 | 9/2014 | Malipatil et al. |
| 8,891,701 | B1 | 11/2014 | Eliaz et al. |
| 8,923,382 | B2 | 12/2014 | Ito et al. |
| 9,264,187 | B1 * | 2/2016 | Sosa ................. H04L 1/203 |
| 2006/0274861 | A1 * | 12/2006 | Langenbach ..... H04L 25/03197 |
| | | | 375/341 |
| 2007/0104491 | A1 * | 5/2007 | Hainberger ........ H04B 10/2942 |
| | | | 398/175 |
| 2013/0202064 | A1 | 8/2013 | Chmelar |
| 2013/0344827 | A1 | 12/2013 | Epifano |
| 2014/0077981 | A1 | 3/2014 | Rachid et al. |
| 2014/0269881 | A1 | 9/2014 | He et al. |
| 2014/0301498 | A1 | 10/2014 | Rimini et al. |
| 2015/0012249 | A1 | 1/2015 | Li et al. |
| 2015/0043926 | A1 | 2/2015 | Levy et al. |

OTHER PUBLICATIONS

Beyene, et al.; Statistical Simulation of High-Speed Links with Transmitter and Receiver Nonlinearities; Rambus, Inc. © 2014 IEEE; pp. 35-38.

Chen; Decision Feedback Equalizer (DFE) Behavioral Macro Model for Packaging System Eye Diagram Transient Simulations; 2011 Electronic Components and Technology; pp. 209-216.

Honig, et al; Suppression of Near- and Far-End Crosstalk by Linear Pre- and Post-Filtering; IEEE Journal on Selected Areas in Communications, vol. 10, No. 3, Apr. 1992; pp. 614-629.

Honig, et al.; Adaptive Interference Suppression; Prepared in part under the support of the U.S. Army Research Office under Grant DAAH04-96/1/0378, and in part under the support of the U.S. Office of Naval Research under Grant N00014-94/1/0115; pp. 64-128.

* cited by examiner

METHOD OF ANALOG FRONT END OPTIMIZATION IN PRESENCE OF CIRCUIT NONLINEARITY

CROSS-REFERENCE TO RELATED APPLICATION(S)

The present application claims priority to and the benefit of U.S. Provisional Application No. 62/086,604, filed Dec. 2, 2014, entitled "A METHOD OF ANALOG FRONT END OPTIMIZATION IN PRESENCE OF CIRCUIT NONLINEARITY", the entire content of which is incorporated herein by reference.

FIELD

One or more aspects of embodiments according to the present invention relate to data transmission, and more particularly to a method for analyzing and designing a continuous-time linear equalizer for use in a serial data link.

BACKGROUND

Intersymbol interference (ISI) is a form of distortion of a digital signal transmitted across a serial link in which one symbol interferes with subsequent symbols causing the symbols to "blur" together. ISI may have an effect similar to noise.

A serial link may include a serial transmitter, a channel, and a serial receiver. ISI may be caused, for example, by a channel with a non-ideal frequency response, e.g., a channel that attenuates high-frequency components of a signal more than low-frequency components, or delays the phase of some frequency components more than others. Other elements in a serial link may also cause ISI.

The presence of ISI in a system may introduce errors in a decision device such as a slicer at the receiver output. One approach for reducing the effects of ISI involves the use of one or more filters that compensate or partially compensate for the frequency response of the channel, so that the frequency response of the cascade of the channel and the one or more filters is ideal or more nearly ideal than the channel. In the design of such (transmitting and receiving) filters, an objective may be to minimize the effects of ISI, and thereby deliver the digital data to its destination with the smallest error rate possible.

A continuous-time linear equalizer (CTLE) may be used as a part of the analog front end of a receiver to cancel the part of the system ISI introduced by a channel. A CTLE may be an analog circuit, which may have a large number of possible configurations; each configuration produces a different circuit behavior, e.g., a different frequency response. Of these configurations it may be that only a small subset (e.g., one) minimizes ISI, and results in a lower error rate for the link.

Some or all aspects of a CTLE may be hard-wired, e.g., they may be controlled by component values selected at design time and fabricated as part of the fabrication of an integrated circuit. In such a case, the CTLE configuration expected to provide the best performance may be identified by trial and error in simulation. For example, a time-domain simulation may be run repeatedly over a large set of CTLE configurations, and the configuration that produces the best performance may be selected. Such an approach may be costly and time consuming. Thus, there is a need for efficient systems and or methods for identifying CTLE configurations expected to provide good performance in a link with ISI.

SUMMARY

According to an embodiment of the present invention there is provided a method for manufacturing a serial link including a channel and a receiver, the link including a plurality of linear time-invariant blocks, the receiver including a continuous-time linear equalizer (CTLE) including a nonlinear block having an input and an output, and a slicer having an input, the method including: for each of a plurality of candidate CTLE configurations of the CTLE: calculating a first probability density function (PDF), corresponding to a first signal value, at the input of the nonlinear block, calculating a first PDF, corresponding to the first signal value, at the output of the nonlinear block from the first PDF at the input of the nonlinear block; calculating a second PDF, corresponding to a second signal value, at the input of the nonlinear block, calculating a second PDF, corresponding to the second signal value, at the output of the nonlinear block from the second PDF at the input of the nonlinear block; calculating a bit error rate, from: the first PDF at the output of the nonlinear block; and the second PDF at the output of the nonlinear block; selecting a configuration, from among the candidate CTLE configurations, satisfying a criterion; and fabricating the CTLE with the selected configuration.

In one embodiment, the selecting of the configuration from among the plurality of candidate CTLE configurations satisfying the criterion includes selecting a configuration from among the plurality of candidate CTLE configurations for which the calculated bit error rate is least.

In one embodiment, the calculating of the first PDF at the input of the nonlinear block includes: calculating a first noise contribution at the input of the nonlinear block; calculating a second noise contribution at the input of the nonlinear block, and calculating a convolution of: a PDF of a signal contribution for a first signal value; a PDF of the first noise contribution; and a PDF of the second noise contribution.

In one embodiment, the calculating of the first noise contribution at the input of the nonlinear block includes: calculating the convolution of: an autocorrelation function of a noise contribution at the input of a linear time-invariant block, of the plurality of linear time-invariant blocks, connected to the nonlinear block and an impulse response of the linear time-invariant block.

In one embodiment, the calculating of the bit error rate includes calculating the sum of: the integral, from negative infinity to zero, of the first PDF at the output of the nonlinear block and the integral, from zero to positive infinity, of the second PDF at the output of the nonlinear block.

In one embodiment, the method includes: calculating a convolution of: the first PDF at the output of the nonlinear block; and a PDF of a decision feedback equalizer (DFE) output.

In one embodiment, the method includes calculating the PDF of the DFE output, the calculating of the PDF of the DFE output including calculating a convolution of a plurality of tap PDFs, each tap PDF being the product of a DFE tap weight and a PDF of a data signal.

In one embodiment, the calculating of the bit error rate further includes calculating the sum of: the integral, from negative infinity to zero, of the first PDF at the input of the slicer.

In one embodiment, a first candidate CTLE configuration of the plurality of candidate CTLE configurations has a zero at a first frequency and a second candidate CTLE configuration of the plurality of candidate CTLE configurations has a zero at a second frequency, the second frequency being at least 10% greater than the first frequency.

In one embodiment, a first candidate CTLE configuration of the plurality of candidate CTLE configurations has a pole at a first frequency and a second candidate CTLE configuration of the plurality of candidate CTLE configurations has a pole at a second frequency, the second frequency being at least 10% greater than the first frequency.

According to an embodiment of the present invention there is provided a system for manufacturing a serial data link including a channel and a receiver, the link including linear time-invariant elements, the receiver having a continuous-time linear equalizer (CTLE) including a nonlinear block and a slicer having an input, the system including: a processing unit; and an integrated circuit fabrication equipment, the processing unit being configured to: for each of a plurality of candidate CTLE configurations of the CTLE: calculate a first probability density function (PDF), corresponding to a first signal value, at the input of the nonlinear block, calculate a first PDF, corresponding to the first signal value, at the output of the nonlinear block from the first PDF at the input of the nonlinear block; calculate a second PDF, corresponding to a second signal value, at the input of the nonlinear block, calculate a second PDF, corresponding to the second signal value, at the output of the nonlinear block from the second PDF at the input of the nonlinear block; calculate a bit error rate, from: the first PDF at the output of the nonlinear block; and the second PDF at the output of the nonlinear block; select a configuration, from among the plurality of candidate CTLE configurations, satisfying a criterion; and the integrated circuit fabrication equipment being capable of fabricating the CTLE with the selected CTLE configuration.

In one embodiment, the selecting of a configuration from among the plurality of candidate CTLE configurations satisfying a criterion includes selecting a configuration from among the plurality of candidate CTLE configurations for which the calculated bit error rate is least.

In one embodiment, the calculating of the first PDF at the input of the nonlinear block includes: calculating a first noise contribution at the input of the nonlinear block; calculating a second noise contribution at the input of the nonlinear block, and calculating a convolution of: a PDF of a signal contribution for a first signal value; a PDF of the first noise contribution; and a PDF of the second noise contribution.

In one embodiment, the calculating of the first noise contribution at the input of the nonlinear block includes: calculating the convolution of: an autocorrelation function of a noise contribution at the input of a linear time-invariant block, of the plurality of linear time-invariant blocks, connected to the nonlinear block and an impulse response of the linear time-invariant block.

In one embodiment, the calculating of the bit error rate includes calculating the sum of: the integral, from negative infinity to zero, of the first PDF at the output of the nonlinear block and the integral, from zero to positive infinity, of the second PDF at the output of the nonlinear block.

In one embodiment, the calculating of the first noise contribution at the input of the nonlinear block includes: calculating a convolution of: the first PDF at the output of the nonlinear block; and a PDF of a decision feedback equalizer (DFE) output.

In one embodiment, the calculating of the bit error rate further includes calculating the PDF of the DFE output, the calculating of the PDF of the DFE output including calculating a convolution of a plurality of tap PDFs, each tap PDF being the product of a DFE tap weight and a PDF of a data signal.

In one embodiment, the calculating of the bit error rate further includes calculating the sum of: the integral, from negative infinity to zero, of the first PDF at the input of the slicer.

In one embodiment, a first candidate CTLE configuration of the plurality of candidate CTLE configurations has a zero at a first frequency and a second candidate CTLE configuration of the plurality of candidate CTLE configurations has a zero at a second frequency, the second frequency being at least 10% greater than the first frequency.

According to an embodiment of the present invention there is provided a system for fabricating a serial data link including a channel and a receiver, the link including linear time-invariant elements, the receiver having a continuous-time linear equalizer (CTLE) including a nonlinear block and a slicer having an input, the system including: means for: for each of a plurality of candidate CTLE configurations: calculating a first probability density function (PDF), corresponding to a first signal value, at the input of the nonlinear block, calculating a first probability density function (PDF), corresponding to the first signal value, at the output of the nonlinear block; calculating a second probability density function (PDF), corresponding to a second signal value, at the input of the nonlinear block, calculating a second probability density function (PDF), corresponding to the second signal value, at the output of the nonlinear block; calculating a bit error rate, from: the first probability density function (PDF) at the output of the nonlinear block; and the second probability density function (PDF) at the output of the nonlinear block; means for selecting a configuration, from among the configurations, satisfying a criterion; and means for fabricating a CTLE with the selected configuration.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a method of analog front end optimization in presence of circuit nonlinearity provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

At the design stage of a serial link, i.e., when the components for a serial link are designed, the impulse response of the channel and the characteristics of the CTLE (including its nonlinearity) may be available to the designer. Some of the characteristics of the CTLE, such as the frequencies of poles and zeros of its frequency response may be adjusted by the selection of component values; other characteristics, such as some of the nonlinear characteristics of the CTLE, may be adjustable within certain constraints. This knowledge of the CTLE characteristics may be combined with information regarding the expected noise on the link to create a statistical characterization of signal and noise at various points in the link. The statistical characterization may include a probability density function (PDF, or "pdf") of a quantity (e.g., a voltage) at a point in the link. The expected bit error rate (BER) may then be computed from the PDF.

A method according to some embodiments may be used to calculate a predicted BER, for a link including portions that approximate one or more linear systems as well as portions that include significant nonlinearity, when the characteristics of this nonlinearity are known at the design stage. The BER may be calculated using modified PDFs that account for nonlinearity.

Figure 1A:
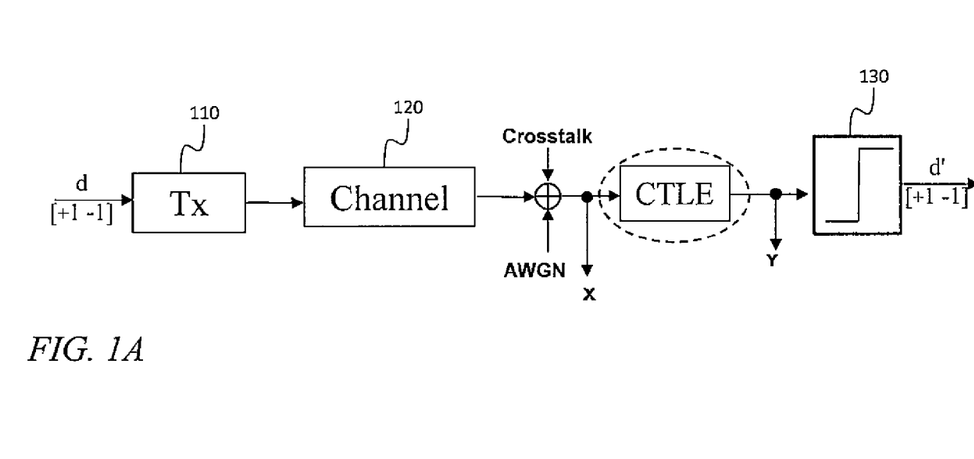
FIG. 1A is a block diagram of a system model of a serial link according to an embodiment of the present invention.

Referring to FIG. 1A, in one embodiment a system model for a serial link includes a serial transmitter (Tx) 110, transmitting data into and through a channel 120, a CTLE receiving a signal from the output of the channel 120, and a slicer 130, receiving a signal from the output of the CTLE. The input to the slicer 130 may include (e.g., consist of) the signal and various sources of error, such as additive white Gaussian noise (AWGN), ISI, and crosstalk. Additive white Gaussian noise may be generated by various mechanisms such as thermal noise produced by any resistive elements in the link, or shot noise produced by semiconductor junctions. Crosstalk (or "xtalk") may be due to data being transmitted in other channels near the channel being analyzed, and coupling into the channel being analyzed (e.g., by capacitive or inductive coupling) with a transfer function referred to herein as a crosstalk transfer function (or, equivalently, with a corresponding crosstalk impulse response). The sources of error are collectively referred to herein as "noise" or "noise contributions". The signal may be, for example, a voltage that would be present at the input of the slicer if no sources of error were present. The noise may be modeled, without loss of generality, as noise added at the point "X" which is the output of the channel, and the input of the CTLE, as shown in FIG. 1A.

Figure 1B:
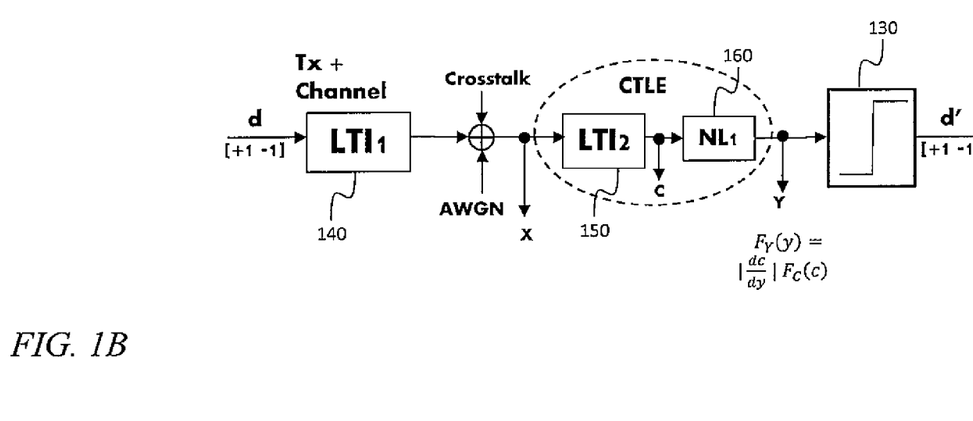
FIG. 1B is a block diagram of a mathematical model of a serial link, according to an embodiment of the present invention.

Referring to FIG. 1B, the system of FIG. 1A may be represented by a mathematical model. In this model the combination of the serial transmitter 110 and the channel 120 is modeled by a first linear time-invariant block ($LTI_1$) 140, and the CTLE is modeled by the combination of a second linear time-invariant block ($LTI_2$) 150 and a first nonlinear block ($NL_1$) 160.

The noise may then be calculated at various points in FIG. 1B using a combination of several analysis methods. For signals propagating through a linear time-invariant block in the model, the PDF of the output can be calculated by any of several methods known to those of skill in the art. For example, the power spectral density of the output of a linear time-invariant system may be calculated as the product of (i) the power spectral density of the input of the linear time-invariant system, and (ii) the squared modulus of the (complex) frequency response of the linear time-invariant system. Equivalently, in the time domain, the autocorrelation function of the output of the linear time-invariant system may be calculated as the convolution of (i) the autocorrelation function of the input of the linear time-invariant system and (ii) the impulse response of the linear time-invariant system. For example, the PDF of crosstalk at the point C in the CTLE, between the second linear time-invariant block ($LTI_2$) 150 and the first nonlinear block ($NL_1$) 160, may be calculated from the crosstalk at the point X (at the input to the CTLE) and the impulse response of the second linear time-invariant block 150, by convolving the autocorrelation function of the crosstalk at the point X with the impulse response of the second linear time-invariant block 150.

Models for the various kinds of noise may be generated as follows. First, the PDF of the signal at the transmitter, and the PDF of the signal in a nearby channel, may each be modeled as two delta functions corresponding to two values (e.g., two voltage values) the signal may take, e.g., one delta function at a value of 1 and one delta function at a value of −1, each delta function having an amplitude of ½. The ISI at the input to the CTLE may be then calculated from the statistical characteristics of the signal (including the current bit, and previously and subsequently transmitted bits), and the frequency response of the first linear time-invariant block 140, using, e.g., one of the methods described above. The PDF of crosstalk may similarly be calculated from the statistical characteristics of the signal in a nearby channel, and the impulse response of the crosstalk transfer function. The PDF of AWGN may be calculated from models of the mechanisms producing the AWGN, e.g., models of shot noise or thermal noise.

At points in the model of FIG. 1B at which several sources of noise contribute, the PDF of the total of the several contributing sources of noise (e.g., a contribution from ISI, a contribution from crosstalk, and a contribution from AWGN, at the input to the CTLE) may be calculated as the convolution of the respective PDFs of the noise contributions. For example, the PDF of the total noise at the input to the first nonlinear block 160 (i.e., the point C in FIG. 1B), may be calculated as the convolution of the noise due to AWGN, the noise due to crosstalk, and the noise due to ISI.

The PDF at the input to the first nonlinear block 160, including signal and noise, may be calculated separately for two cases, for which the signal is +1 or −1, respectively (i.e., a first PDF and a second PDF may be calculated), according to the following expression:

$$F_x(x) = \text{PDF(Signal)} \otimes \text{PDF(AWGN)} \otimes \text{PDF(crosstalk)} \otimes \text{PDF(ISI)}$$

Where $\otimes$ is the convolution operator, PDF(Signal) is a delta function at a first value (e.g., +1) for a signal of +1 and a delta function at a second value (e.g., −1) for a signal of −1.

The PDF at the output of the first nonlinear block 160 is then calculated from the following equation:

$$F_Y(y) = |dc/dy| F_C(c)$$

where $F_C(c)$ is the PDF of the input to the first nonlinear block 160, $F_Y(y)$ is the PDF of the output from the first nonlinear block 160, and $|dc/dy|=1/(|dy/dc|)$ is the absolute value of the reciprocal of the derivative of the (nonlinear) function forming the output of the first nonlinear block 160 from its input. This function may also be referred to as the nonlinearity profile of the first nonlinear block 160.

This process may be repeated for both cases, i.e., cases in which the signal is a +1 or −1, respectively, to form a first PDF at the output of the first nonlinear block 160 and a second PDF at the output of the first nonlinear block 160. For example the PDF, when the signal is +1, may be a function with a peak at a value of +1, and having a finite width as a result of noise signals having been added to it. Similarly, the PDF, when the signal is −1, may be a function with a peak at a value of −1, and also having a finite width. Once the PDFs, corresponding to signals of +1 and −1, have been calculated at the input to the slicer, the BER can be calculated by integrating the PDF:

$$BER = \int_{-\infty}^{0} F_Y(y|1) dy + \int_{0}^{\infty} F_Y(y|-1) dy \quad (1)$$

where $F_Y(y|1)$ is the PDF of the input to the slicer when the signal is +1, and $F_Y(y|-1)$ is the PDF of the input to the slicer when the signal is −1. In other words, the BER is the sum of (i) the probability of the slicer detecting the received bit as a −1 when in fact the signal is +1, and (ii) the probability of the slicer detecting the received bit as a +1 when in fact the signal is −1.

Figure 2:
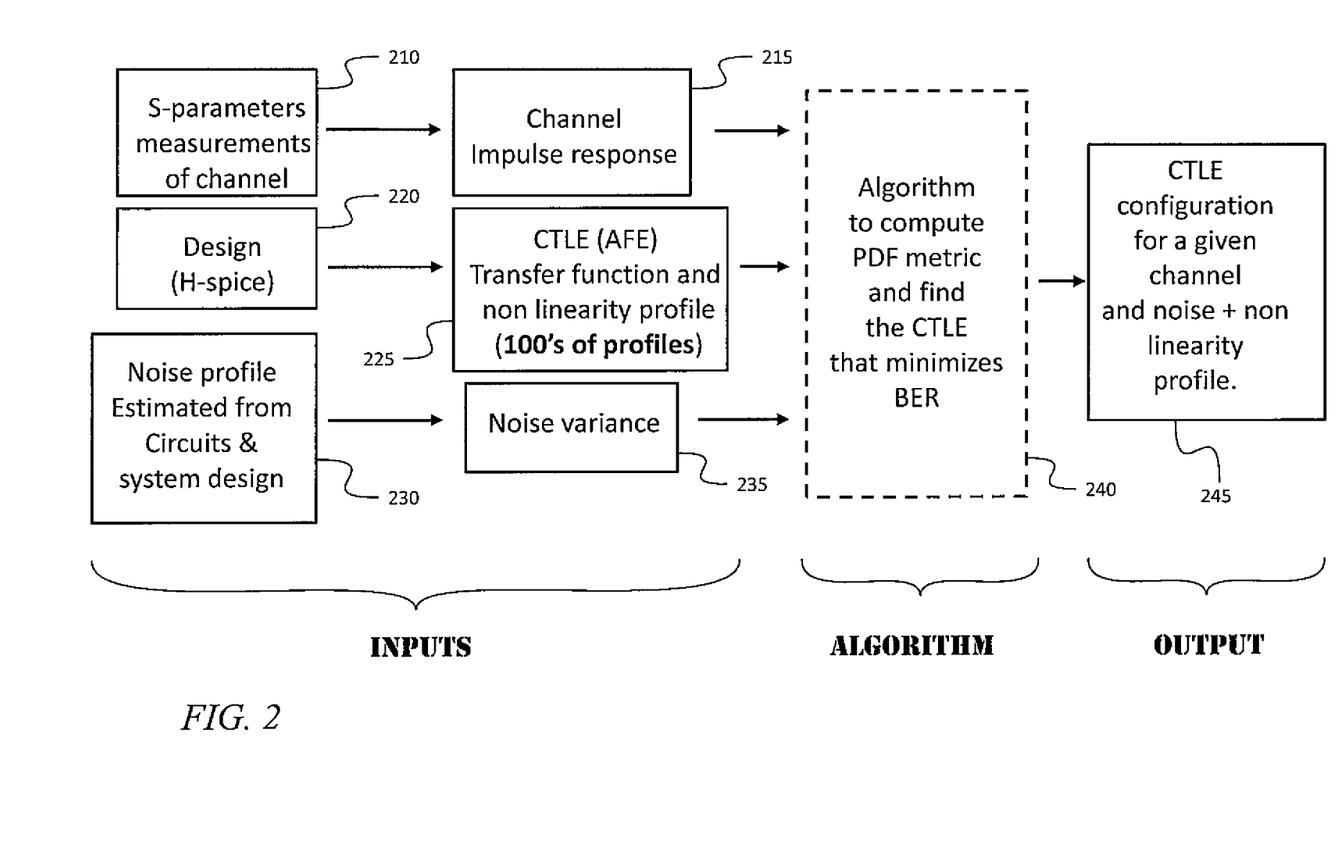
FIG. 2 is a combination dataflow diagram and flowchart illustrating a process for selecting a CTLE configuration, according to an embodiment of the present invention.

Referring to FIG. 2, in one embodiment a design process involves beginning with a set of inputs including channel characteristics, CTLE characteristics and noise characteristics. The channel may be characterized, in an act 210, by S-parameters that may, for example, be measured. From these S-parameters, a channel impulse response is calculated, in an act 215. The CTLE design may be simulated, in an act 220, e.g., using HSPICE™ (available from Synopsis, synopsis.com) for a set of candidate CTLE configurations, and a set of corresponding transfer functions and nonlinearity profiles may be generated, in an act 225. The set of CTLE configurations may, for example, include designs differing in the frequency response of the second linear time-invariant block 150. For example, the second linear time-invariant block 150 may have a frequency response that is generally that of a high-pass filter, to counteract the low-pass characteristic that may be present in the channel. Such a high-pass filter may have one or more zeros at a first frequency or in a first frequency range, and one or more poles at a second frequency, or in a second frequency range, higher than the first frequency or first frequency range. In different candidate CTLE configurations, the frequencies of the poles and zeros may differ. For example, an array of candidate CTLE configurations may have a first zero at a frequency that increases by 10% or by 15% from one element of the array to the next, or a first pole at a frequency that increases by 10% or by 15% from one element of the array to the next.

Noise characteristics may be estimated, in an act 230, from the circuits and system design of the serial link and any other nearby links (that may contribute crosstalk), and a noise variance may be calculated, in an act 235, from the noise profiles. An algorithm may then be used, in an act 240, to estimate the BER for each of the CTLE designs, and a CTLE configuration 245 may result that provides an acceptable BER, or the lowest BER of those predicted for the set of CTLE configurations evaluated.

Figure 3:
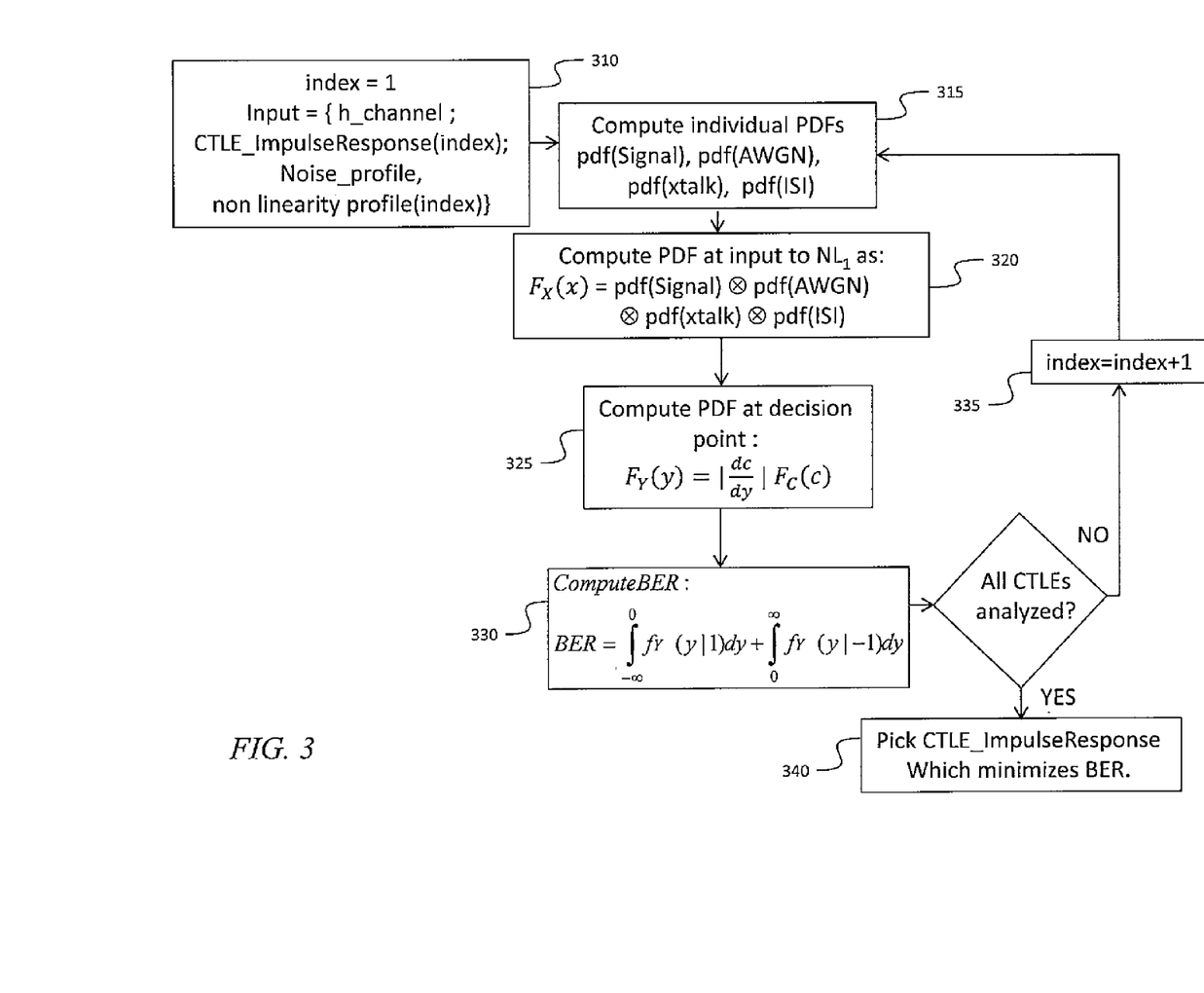
FIG. 3 is a flowchart illustrating a process for selecting a CTLE configuration, according to an embodiment of the present invention.

Referring to FIG. 3, in one embodiment an index is used to identify CTLE configurations within a set of CTLE configurations to be evaluated. The evaluation process begins, in an act 310, with setting the index to 1 and receiving, as input, for each CTLE configuration to be evaluated, an impulse response and a nonlinearity profile. Also received as input are an impulse response for the channel, and a noise profile. The noise profile may include (e.g., consist of) models for each of several noise sources at the input of the CTLE. In an act 315, the individual PDFs for the signal, AWGN, crosstalk, and ISI are calculated, and these are convolved, in an act 320, to form the PDF at the input of the first nonlinear block 160. The PDF at the decision point (i.e., the input of the slicer) is then calculated in an act 325 by multiplying the PDF at the input of the first nonlinear block 160 by the absolute value of the derivative of the input with respect to the output (i.e., dividing by the absolute value of the derivative of the output with respect to the input). In an act 330, the BER is then calculated, using Equation (1) above.

The process of executing acts 315 through 330 is then repeated, in a loop, for each of the CTLE configurations, by advancing the index, in an act 335, after each calculation of the BER in act 330. Finally, in an act 340, the CTLE configuration that resulted in the best (i.e., lowest) predicted BER is selected, and used to fabricate a receiver.

Figure 4A:
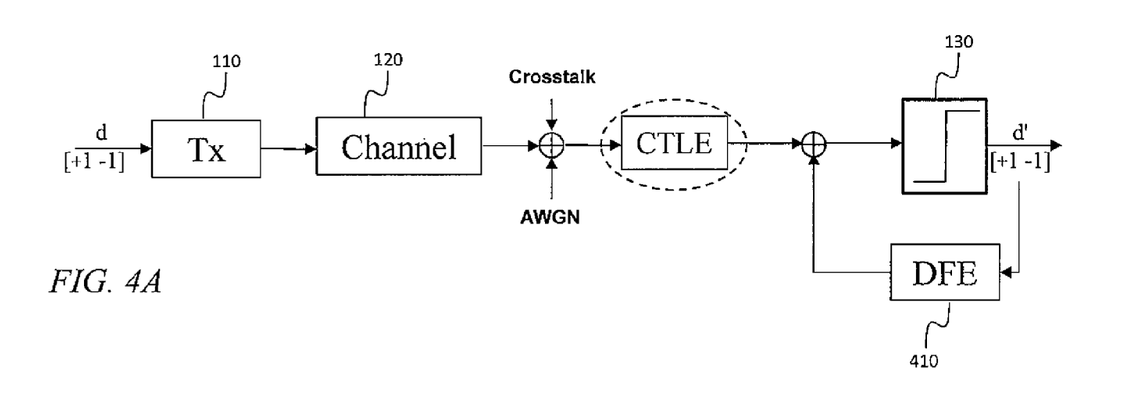
FIG. 4A is a block diagram of a system model of a serial link according to an embodiment of the present invention.
Figure 4B:
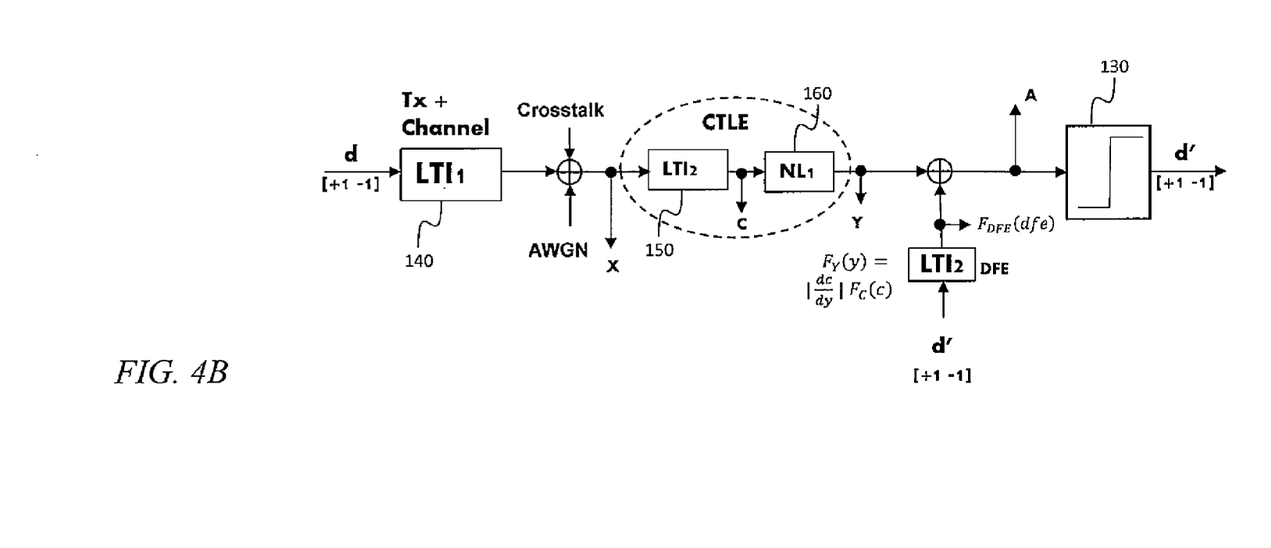
FIG. 4B is a block diagram of a mathematical model of a serial link, according to an embodiment of the present invention.

Referring to FIGS. 4A and 4B, in one embodiment a similar method is used to select a CTLE configuration for a receiver including a decision feedback equalizer (DFE) 410. The DFE of FIG. 4A adds, at the input of the slicer, a weighted sum of previously received bits, with the weights (referred to as DFE "taps") being selected so that the output of the DFE will tend to cancel the contribution of ISI at the input of the slicer. The effect of the DFE is modeled in the mathematical model of FIG. 4B as adding a contribution at the output of the CTLE (i.e., at the input of the slicer) with a PDF given by:

$$F_{DFE}(dfe) = (\text{Tap}_1 \times \text{PDF}(d)) \otimes (\text{Tap}_2 \times \text{PDF}(d)) \otimes \ldots \otimes (\text{Tap}_n \times \text{PDF}(d)),$$

where each of the products $\text{Tap}_k \times \text{PDF}(d)$ is a noise contribution that may be referred to as a tap PDF, and where n is the number of taps in the DFE. The PDF at the point A of FIG. 4B (at the input to the slicer) is then given by $$F_A(a) = F_{DFE}(dfe) \otimes F_Y(y)$$

The analysis and selection of a CTLE configuration then proceeds as for the model of FIG. 1B, with this modified expression for the PDF at the input of the slicer. In particular, referring to FIG. 5, in one embodiment an index is used to identify CTLE configurations within a set of CTLE configurations to be evaluated. The evaluation process begins, in an act 510, with setting the index to 1 and receiving, as input, for each CTLE configuration to be evaluated, an impulse response and a nonlinearity profile. Also received as input are an impulse response for the channel, and a noise profile. Also received as input are an impulse response for the channel, and a noise profile. The noise profile may consist of models for each of several noise sources at the input of the CTLE. In an act 515, the individual PDFs for the signal, AWGN, crosstalk, and ISI are calculated, and these are convolved, in an act 520, to form the PDF at the input of the first nonlinear block 160. The PDF at the output of the CTLE is then calculated in an act 525, by multiplying the PDF at the input of the first nonlinear block 160 by the absolute value of the derivative of the input with respect to the output (i.e., dividing by the absolute value of the derivative of the output with respect to the input). The values of DFE taps are calculated in an act 527. This calculation may be based on simulation, or on the pulse response of the portion of the link ending at the output of the CTLE (i.e., the transmitter, the channel, and the CTLE). In an act 528, the PDF at the decision point (i.e., at the input of the slicer) is calculated. In an act 530, the BER is then calculated, using Equation (1) above.

Figure 5:
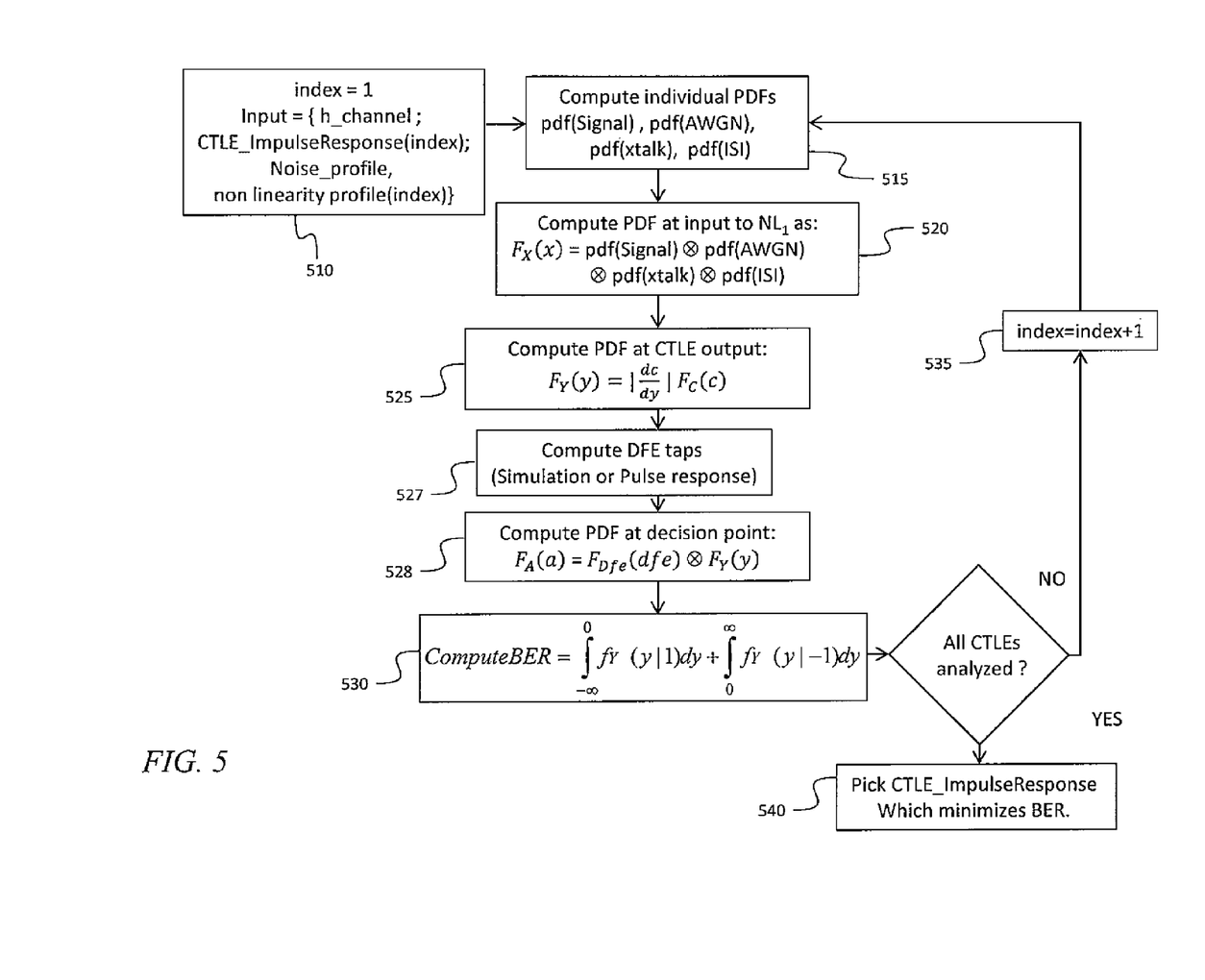
FIG. 5 is a flowchart illustrating a process for selecting a CTLE configuration, according to an embodiment of the present invention.

The process of executing acts 515 through 530 is then repeated, in a loop, for each of the CTLE configurations, by advancing the index, in an act 535, after each calculation of the BER in act 530. Finally, in an act 540, the CTLE configuration that resulted in the best (i.e., lowest) predicted BER is selected, and is used to fabricate a receiver.

Figure 6:
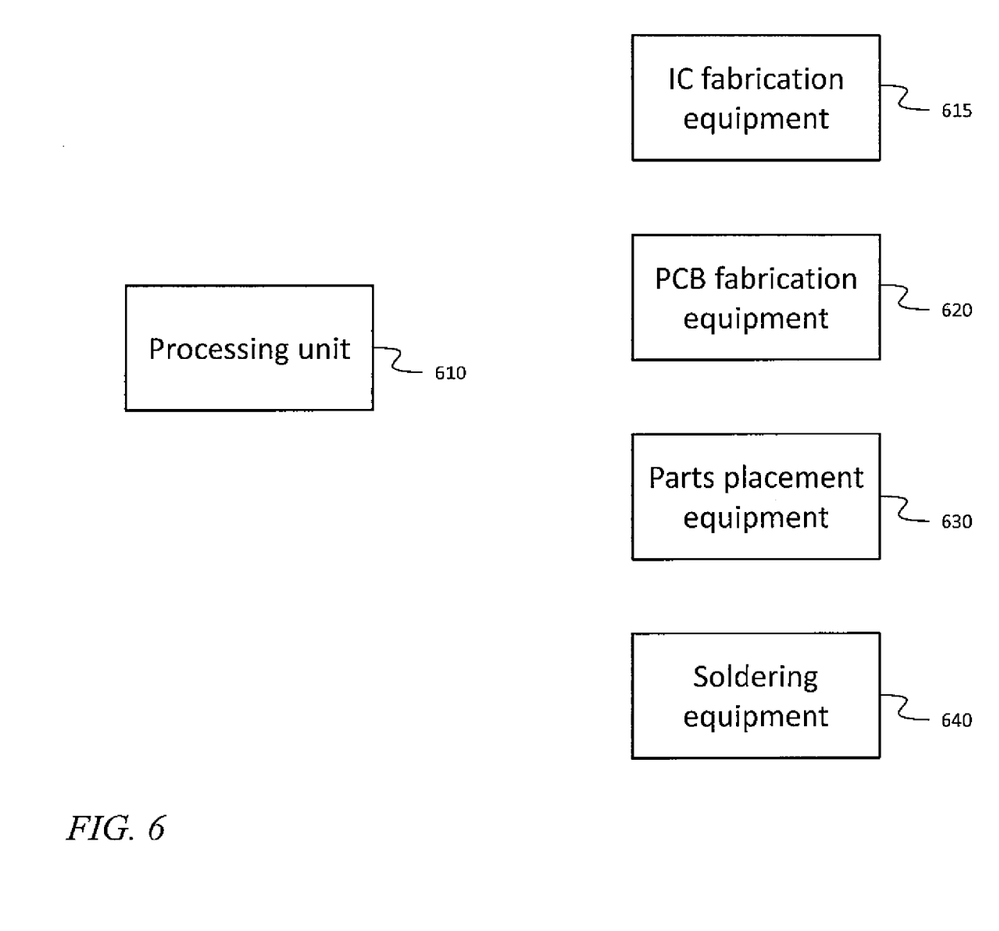
FIG. 6 is a block diagram of a system for designing and fabricating a serial link, according to an embodiment of the present invention.

Referring to FIG. 6, a serial link may be designed using a processing unit 610 (or a processing unit connected to a memory), and fabricated using, for example, integrated circuit (IC) fabrication equipment 615, printed circuit board (PCB) fabrication equipment 620, parts placement equipment 630, and soldering equipment 640.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A storage medium such as a memory may be part of the processing unit, or it may be a separate component. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

Figure 7:
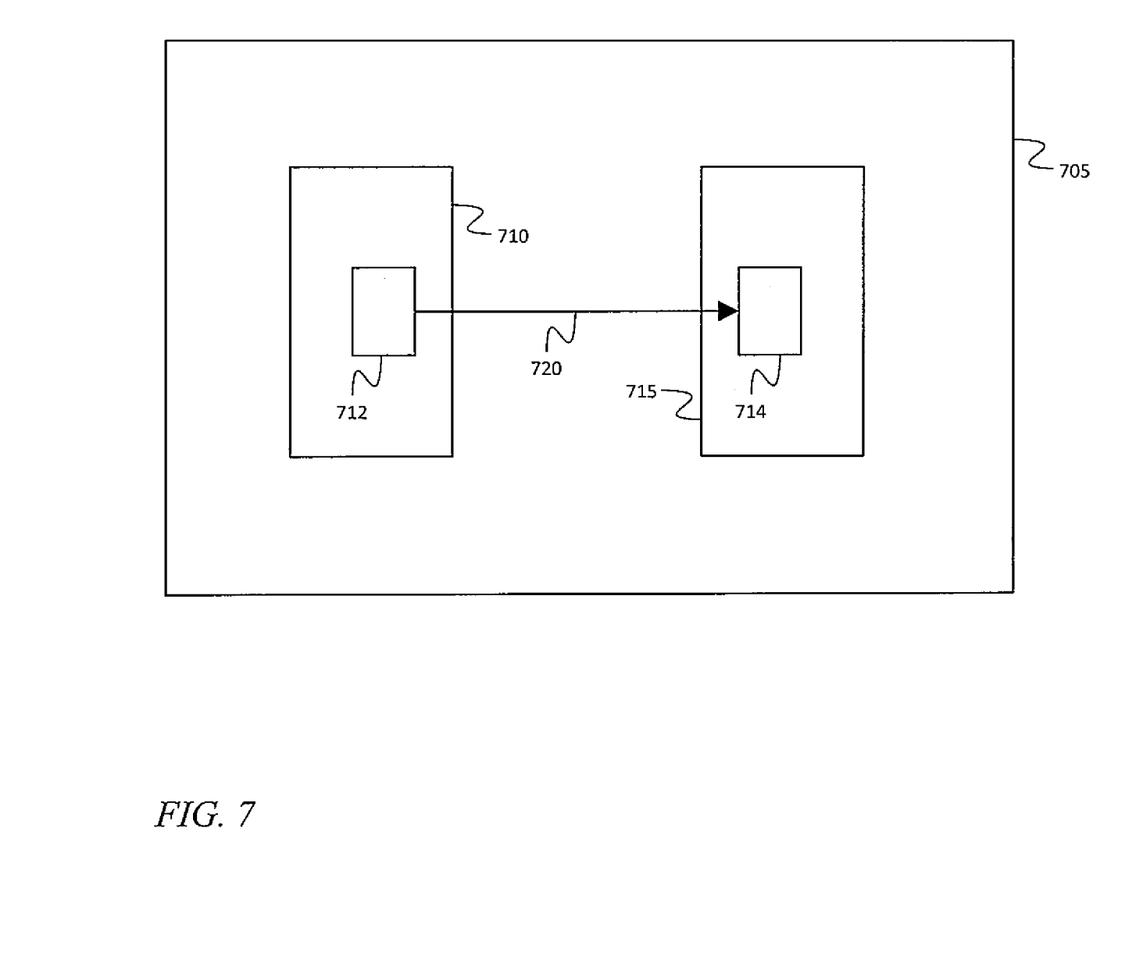
FIG. 7 is a block diagram of a display designed and fabricated according to embodiments of the present invention.

Referring to FIG. 7, in one embodiment, a display 705 contains a timing controller 710 including a serial transmitter 712 configured to send high-speed digital data to a serial receiver 714 in a driver integrated circuit (driver IC) 715, over a non-ideal (e.g., lossy) channel 720. The receiver 714 receives a signal that is affected by inter-symbol interference. The receiver 714 includes a CTLE designed and fabricated according to an embodiment of the present invention. Here, in embodiments of the present invention, the display is an organic light emitting diode (OLED) display or a liquid crystal display (LCD).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

The electronic or electric devices and/or any other relevant devices or components of a serial link according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a method of analog front end optimization in presence of circuit nonlinearity have been specifically described and illustrated herein, many modifications and variations will be apparent to those skilled in the art. Accordingly, it is to be understood that a method of analog front end optimization in presence of circuit nonlinearity practiced according to principles of this invention may be embodied other than as specifically described herein. The invention is also defined in the following claims, and equivalents thereof.

What is claimed is:

1. A method for manufacturing a serial link comprising a channel and a receiver, the link comprising a plurality of linear time-invariant blocks, the receiver comprising a continuous-time linear equalizer (CTLE) comprising a nonlinear block having an input and an output, and a slicer having an input, the method comprising:
for one candidate CTLE configuration at a time of each of a plurality of candidate CTLE configurations of the CTLE:
calculating a first input probability density function (PDF), corresponding to a first signal value, at the input of the nonlinear block;
calculating a first output PDF, corresponding to the first signal value, at the output of the nonlinear block from the first PDF at the input of the nonlinear block;
calculating a second input PDF, corresponding to a second signal value, at the input of the nonlinear block;
calculating a second output PDF, corresponding to the second signal value, at the output of the nonlinear block from the second PDF at the input of the nonlinear block; and
calculating a bit error rate, from:
the first output PDF at the output of the nonlinear block; and
the second output PDF at the output of the nonlinear block;
selecting a configuration, from among the candidate CTLE configurations, satisfying a criterion related to the calculated bit error rate; and
fabricating the CTLE with the selected configuration, utilizing integrated circuit fabrication equipment.

2. The method of claim 1, wherein the selecting of the configuration from among the plurality of candidate CTLE configurations satisfying the criterion comprises selecting a configuration from among the plurality of candidate CTLE configurations for which the calculated bit error rate is least.

3. The method of claim 1, wherein the calculating of the first input PDF at the input of the nonlinear block comprises:
calculating a first noise contribution at the input of the nonlinear block;
calculating a second noise contribution at the input of the nonlinear block, and calculating a convolution of:
a PDF of a signal contribution for a first signal value;
a PDF of the first noise contribution; and
a PDF of the second noise contribution.

4. The method of claim 3, wherein the calculating of the first noise contribution at the input of the nonlinear block comprises:
calculating the convolution of:
an autocorrelation function of a noise contribution at the input of a linear time-invariant block, of the plurality of linear time-invariant blocks, connected to the nonlinear block and
an impulse response of the linear time-invariant block.

5. The method of claim 1, wherein the calculating of the bit error rate comprises calculating the sum of:
the integral, from negative infinity to zero, of the first output PDF at the output of the nonlinear block and
the integral, from zero to positive infinity, of the second output PDF at the output of the nonlinear block.

6. The method of claim 1, wherein the calculating of the bit error rate comprises calculating a first PDF at the input of the slicer, the calculating of the first PDF at the input of the slicer comprising:
calculating a convolution of:
the first output PDF at the output of the nonlinear block; and
a PDF of a decision feedback equalizer (DFE) output.

7. The method of claim 6, further comprising calculating the PDF of the DFE output, the calculating of the PDF of the DFE output comprising calculating a convolution of a plurality of tap PDFs, each tap PDF being the product of a DFE tap weight and a PDF of a data signal.

8. The method of claim 7, wherein the calculating of the bit error rate further comprises calculating the sum of:
the integral, from negative infinity to zero, of the first PDF at the input of the slicer.

9. The method of claim 1, wherein a first candidate CTLE configuration of the plurality of candidate CTLE configurations has a zero at a first frequency and a second candidate CTLE configuration of the plurality of candidate CTLE configurations has a zero at a second frequency, the second frequency being at least 10% greater than the first frequency.

10. The method of claim 1, wherein a first candidate CTLE configuration of the plurality of candidate CTLE configurations has a pole at a first frequency and a second candidate CTLE configuration of the plurality of candidate CTLE configurations has a pole at a second frequency, the second frequency being at least 10% greater than the first frequency.

11. A system for manufacturing a serial data link comprising a channel and a receiver, the link comprising a plurality of linear time-invariant elements, the receiver having a continuous-time linear equalizer (CTLE) comprising a nonlinear block and a slicer having an input, the system comprising:
  a processing unit; and
  an integrated circuit fabrication equipment,
  the processing unit being configured to:
    for one candidate CTLE configuration at a time of each of a plurality of candidate CTLE configurations of the CTLE:
      calculate a first input probability density function (PDF), corresponding to a first signal value, at the input of the nonlinear block,
      calculate a first output PDF, corresponding to the first signal value, at the output of the nonlinear block from the first PDF at the input of the nonlinear block;
      calculate a second input PDF, corresponding to a second signal value, at the input of the nonlinear block,
      calculate a second output PDF, corresponding to the second signal value, at the output of the nonlinear block from the second PDF at the input of the nonlinear block;
      calculate a bit error rate, from:
        the first output PDF at the output of the nonlinear block; and
        the second output PDF at the output of the nonlinear block;
    select a configuration, from among the plurality of candidate CTLE configurations, satisfying a criterion; and
  the integrated circuit fabrication equipment being configured to fabricate the CTLE with the selected CTLE configuration.

12. The system of claim 11, wherein the selecting of a configuration from among the plurality of candidate CTLE configurations satisfying a criterion comprises selecting a configuration from among the plurality of candidate CTLE configurations for which the calculated bit error rate is least.

13. The system of claim 11, wherein the calculating of the first input PDF at the input of the nonlinear block comprises:
  calculating a first noise contribution at the input of the nonlinear block;
  calculating a second noise contribution at the input of the nonlinear block, and calculating a convolution of:
    a PDF of a signal contribution for a first signal value;
    a PDF of the first noise contribution; and
    a PDF of the second noise contribution.

14. The system of claim 13, wherein the calculating of the first noise contribution at the input of the nonlinear block comprises:
  calculating the convolution of:
    an autocorrelation function of a noise contribution at the input of a linear time-invariant element, of the plurality of linear time-invariant elements, connected to the nonlinear block and
    an impulse response of the linear time-invariant element.

15. The system of claim 11, wherein the calculating of the bit error rate comprises calculating the sum of:
  the integral, from negative infinity to zero, of the first output PDF at the output of the nonlinear block and
  the integral, from zero to positive infinity, of the second output PDF at the output of the nonlinear block.

16. The system of claim 11, wherein the calculating of the bit error rate comprises calculating a first PDF at the input of the slicer, the calculating of the first PDF at the input of the slicer comprising:
  calculating a convolution of:
    the first output PDF at the output of the nonlinear block; and
    a PDF of a decision feedback equalizer (DFE) output.

17. The system of claim 16, wherein the calculating of the bit error rate further comprises calculating the PDF of the DFE output, the calculating of the PDF of the DFE output comprising calculating a convolution of a plurality of tap PDFs, each tap PDF being the product of a DFE tap weight and a PDF of a data signal.

18. The system of claim 17, wherein the calculating of the bit error rate further comprises calculating the sum of:
  the integral, from negative infinity to zero, of the first PDF at the input of the slicer.

19. The system of claim 11, wherein a first candidate CTLE configuration of the plurality of candidate CTLE configurations has a zero at a first frequency and a second candidate CTLE configuration of the plurality of candidate CTLE configurations has a zero at a second frequency, the second frequency being at least 10% greater than the first frequency.

20. A system for fabricating a serial data link comprising a channel and a receiver, the link comprising linear time-invariant elements, the receiver having a continuous-time linear equalizer (CTLE) comprising a nonlinear block and a slicer having an input, the system comprising:
  means for:
    for one candidate CTLE configuration at a time of each of a plurality of candidate CTLE configurations:
      calculating a first input probability density function (PDF), corresponding to a first signal value, at the input of the nonlinear block,
      calculating a first output probability density function (PDF), corresponding to the first signal value, at the output of the nonlinear block;
      calculating a second input probability density function (PDF), corresponding to a second signal value, at the input of the nonlinear block,
      calculating a second output probability density function (PDF), corresponding to the second signal value, at the output of the nonlinear block;
      calculating a bit error rate, from:
        the first output probability density function (PDF) at the output of the nonlinear block; and
        the second output probability density function (PDF) at the output of the nonlinear block;
  means for selecting a configuration, from among the configurations, satisfying a criterion; and
  integrated circuit fabrication equipment for fabricating a CTLE with the selected configuration.

* * * * *